United States Patent Office 2,921,044
Patented Jan. 12, 1960

2,921,044

METHOD OF MAKING MODIFIED INTERPOLYMERS CONTAINING VINYL CHLORIDE OR VINYLIDENE CHLORIDE

Harry W. Coover, Jr., Kingsport, Tenn., assignor to Eastman Kodak Company, Rochester, N.Y., a corporation of New Jersey No Drawing. Application November 26, 1954
Serial No. 471,503

2 Claims. (Cl. 260—45.5)

This invention relates to the production of modified polymers of vinyl chloride or vinylidene chloride, and to articles prepared therefrom.

It is known that both vinyl chloride and vinylidene chloride give rise to polymers noted for their high softening temperature and excellent mechanical properties. However, it is also known that polymers of vinyl chloride and vinylidene chloride possess the undesirable property of lacking dye affinity.

Attempts have been made to increase the dyeability of vinyl chloride and vinylidene chloride fibers by interpolymerizing vinyl chloride or vinylidene chloride with certain monomers whose polymers have an affinity for dyes. While this procedure does give polymer products, from which fibers having good dyeing properties can be obtained, a serious drawback frequently occurs, a substantial lowering of the softening point of the fiber being observed.

Other attempts have been made to increase the dyeability of polyvinylidene chloride or polyvinyl chloride fibers by mixing them, before spinning, with other polymeric materials which are dye-susceptible. This procedure, likewise, provides fibers having good dyeing properties, however, many of these fibers show a low softening temperature, and in addition, many show segmentation into their individual components along their horizontal axis. For example, it can be demonstrated that mixtures of polyvinyl acetate and polyvinyl chloride, when dissolved in either N,N-dimethylformamide or N,N-dimethylacetamide in proportions varying from 15 to 50% of polyvinyl acetate, based on the total weight of the mixed polyvinyl acetate and polyvinyl chloride, form grainy dopes which separate into two liquid layers on standing. This is also true of many other polymeric materials, natural or synthetic, which are soluble in the above solvents. Fibers which form from these non-homogeneous solutions or mixtures are too low in softening temperature to be of practical value, and are also subject to the defect of segmentation. This is not surprising because of the non-homogeneous condition of the spinning solution and the fact that it is generally known that polyvinyl chloride, or polyvinylidene chloride, is not compatible with many organic substances.

I have now made the unusual and valuable discovery that stable solutions of vinyl chloride or vinylidene chloride polymers, which do not separate into distinct layers on standing, and from which fibers of good dyeability can be spun, can be prepared by polymerizing vinyl chloride or vinylidene chloride (alone or in the presence of another polymerizable monomer) in the presence of an interpolymer, as hereinafter defined, which contains monomer units imparting dye affinity and which has not been separated from its polymerization medium. The polymers of this invention can be prepared by preparing an interpolymer as described below; and, without separation of the interpolymer from its polymerization medium, adding vinyl chloride or vinylidene chloride (alone or in admixture with each other or in admixture with another polymerizable ethenoid monomer) and heating the reaction mixture until the added monomer, or monomers, has polymerized. Alternatively, the vinyl chloride or vinylidene chloride (in the presence or absence of another polymerizable material) can be first polymerized, and the mixture of monomers (containing the monomer which imparts dye affinity) polymerized in admixture with the vinyl or vinylidene chloride polymer which has not been separated from its polymerization medium. These fibers are characterized by a softening point higher than that of the interpolymers referred to above and do not exhibit the segmentation defect shown by many of the fibers prepared from certain prior art mixtures comprising polyvinyl chloride or polyvinylidene chloride. Fibers prepared according to my invention also have a softening point higher than fibers prepared from simple interpolymers of vinyl chloride or vinylidene chloride with monomers which have the property of imparting dye affinity to the polymer products. The polymers which are admixed with the monomeric material to be polymerized have not been separated from the polymerization mixture prior to the addition of the monomeric material, thus distinguishing them from the products obtained in my copending application Serial No. 471,501, filed on even date herewith. A particular advantage of the invention resides in the fact that the chloride polymers of this invention are non-inflammable, while retaining the other desirable characteristics, when the chloride monomer is employed at concentrations as low as 30% by weight based on the total weight of monomeric material which is polymerized with the preformed polymer. This is of great importance in the manufacture of textile fabrics from polymeric fibers embodying the invention. Another very useful characteristic of the polymers embodying the invention is their increased solubility in many organic solvents as compared to the difficultly soluble polyacrylonitrile polymers. This enhanced solubility is readily achieved at low conversions using batch processes; and, even at conversions of the order of 90% or more, polymers having good solubility in such well known solvents as acetone are readily prepared by continuous processes such as are disclosed in the copending application of Wooten and Shields, Serial No. 471,498, filed concurrently herewith, now Patent No. 2,879,256.

It is, therefore, an object of my invention to provide new and improved vinyl chloride or vinylidene chloride polymer compositions. A further object of my invention is to provide methods of making these modified polymer compositions. Still another object is to provide homogeneous solutions obtained from these polymer compositions comprising vinyl chloride or vinylidene chloride. Another object is to provide fibers from these homogeneous solutions, and methods for making these fibers. Another object is to provide composite unitary polymers which are not inflammable and which have high softening temperatures, excellent mechanical properties, particularly in fiber form, and improved solubility and dyeing characteristics. Other objects will become apparent from a consideration of the following description and examples and the appended claims.

Since my invention relates both to the preparation of polymers of vinyl chloride and vinylidene chloride, for the sake of convenience, these monomers are hereinafter referred to as the chloride monomers. The polymers are similarly referred to.

The monomers which are useful in imparting dye affinity to the vinyl chloride or vinylidene chloride polymers of my invention comprise the acrylamides, maleamides, fumaramides, itaconamides, citraconamides, maleamates, fumaramates, itaconamates, citraconamates, acrylates and vinyl esters. The acrylamides have been found especially useful when used according to my invention.

As acrylamides, I can advantageously use in my invention those represented by the following general formula:

(I)
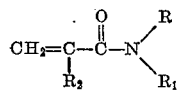

wherein R and R₁ each represents a hydrogen atom or an alkyl group containing from 1 to 4 carbon atoms (e.g. methyl, ethyl, propyl, isopropyl, butyl, isobutyl, etc. groups) and R₂ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylacrylamide, N,N-diethylacrylamide, methacrylamide, N-methylmethacrylamide, N-ethylmethacrylamide, N-isopropylmethacrylamide, N,N - dimethylmethacrylamide, etc. N-cyclohexyl acrylamides can also be used.

As maleamides, I can advantageously use those represented by the following general formula:

(II)
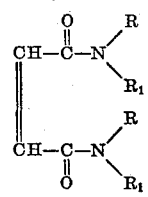

wherein R and R₁ each have the values given above. Typical maleamides include, for example, maleamide, N-methylmaleamide, N-ethylmaleamide, N-propylmaleamide, N-isopropylmaleamide, N-n-butylmaleamide, N,N'-dimethylmaleamide, N,N'-diethylmaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, I can advantageously use those represented by the following general formula:

(III)
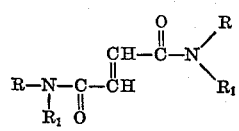

wherein R and R₁ each have the values given above. Typical fumaramides include, for example, fumaramide, N-methylfumaramide, N-ethylfumaramide, N-propylfumaramide, N - isopropylfumaramide, N - n - butylfumaramide, N,N' - dimethylfumaramide, N,N' - diethylfumaramide, N,N' - di - n - butylfumaramide, N - ethyl-N' - methylfumaramide, N - n - butyl - N' - methylfumaramide, N,N' - tetramethylfumaramide, N,N' - tetraethylfumaramide, N,N - diethyl - N',N' - dimethylfumaramide, etc.

As itaconamides, I can advantageously employ those represented by the following general formula:

(IV)
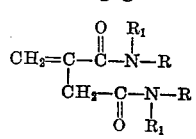

wherein R and R₁ each have the values given above. Typical itaconamides include, for example, itaconamide, N-methylitaconamide, N-ethylitaconamide, N-propylitaconamide, N,N'-dimethylitaconamide, N,N'-diethylitaconamide, etc.

As citraconamides, I can advantageously employ those represented by the following general formula:

(V)
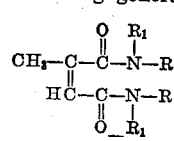

wherein R and R₁ each have the values given above. Typical citraconamides include, for example, citraconamide, N-methylcitraconamide, N-ethylcitraconamide, N-n-butylcitraconamide, N,N'-dimethylcitraconamide, N, N'-diethylcitraconamide, the N,N'-butylcitraconamides, N,N'-tetramethylcitraconamide, etc.

The maleamates useful in practicing my invention comprise those represented by the following general formula:

(VI)
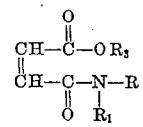

wherein R and R₁ each have the values given above, and R₃ represents an alkyl group of from 1 to 4 carbon atoms (e.g. methyl, etehyl, propyl, isopropyl, n-butyl, isobutyl, etc.). Typical are methyl maleamate, propyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously employ those represented by the following general formula:

(VII)
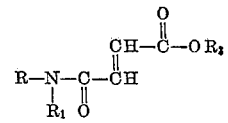

wherein R and R₁, and R₃ each have the values given above. Typical are methyl fumaramate, ethyl fumaramate, propyl fumaramate, n-butyl fumaramate, methyl N-methylfumaramate, ethyl N-methylfumaramate, the butyl N-methylfumaramates, methyl N-dimethylfumaramates, ethyl N-dimethylfumaramates, n-butyl N-dimethylfumaramate, the methyl N-dibutylfumarates, etc.

As itaconamates, I can advantageously employ those represented by the following general formulas:

(VIII)
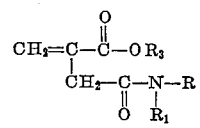

and (VIIIa)
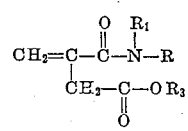

wherein R, R₁, and R₃ each have the values given above. Typical itaconamates include, for example, methyl itaconamate, ethyl itaconamate, propyl itaconamate, the butyl itaconamates, methyl N-methylitaconamate, ethyl N-methylitaconamate, propyl N-methylitaconamate, n-butyl N-methylitaconamate, methyl N-dimethylitaconamate, ethyl N-dimethylitaconamate, n-butyl N-dimethylitaconamate, the methyl N-dibutylitaconamates, etc.

As citraconamates, I can advantageously employ those represented by the following general formulas:

(IX)
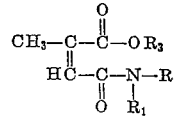

and (IXa)
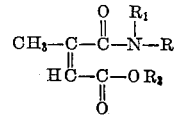

wherein R, R₁, and R₃ each have the values given above. Typical citraconamates include, for example, methyl citraconamate, ethyl citraconamate, propyl citraconamate, the butyl citraconamates, methyl N-methylcitraconamate, ethyl N-methylcitraconamates, propyl N-methylcitraconamates, n-butyl N-methylcitraconamate, methyl N-dimethylcitraconamate, ethyl N-dimethylcitraconamate, n-butyl N-dimethylcitraconamate, the methyl N-dibutylcitraconamates, etc.

As acrylates, I can advantageously employ those represented by the following general formula:

(X)
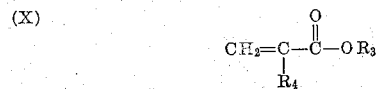

wherein $R_3$ has the values given above, and $R_4$ represents a hydrogen atom, a methyl group, or an ethyl group. Typical acrylates include, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

As vinyl esters, I can advantageously employ those represented by the following general formula:

(XI)
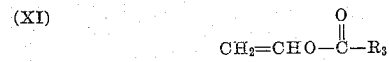

wherein $R_3$ has the values given above. Typical vinyl esters, include, for example, vinyl acetate, vinyl propionate, vinyl butyrate, vinyl isobutyrate, etc.

In practicing my invention from 1 to 99 percent by weight of a monomer (I) selected from those represented by Formulas I to XI, inclusive, is first interpolymerized with from 99 to 1 percent by weight of a different monoethylenically-unsaturated, polymerizable compound (II) containing a (XII)      —CH=C< group, the percent by weight being based on the combined weights of monomer (I) and compound (II), and without separating the resulting interpolymer, the chloride monomer (alone or together with another polymerizable monomer) is added and the polymerization completed. Alternatively, as mentioned above, the chloride monomer (alone or together with another polymerizable monomer) can be first polymerized and the monomer (I) and compound (II) be interpolymerized upon the chloride polymer which has not been separated from its polymerization medium. In general, the first described method is particularly advantageous.

The polymer compositions of my invention contain from 5 to 95 percent by weight of chloride component (i.e. vinyl or vinylidene chloride alone or in admixture with each other or in admixture with one or more polymerizable monomers are referred to as the chloride component) and from 95 to 5 percent by weight of the interpolymer component (interpolymer of compound (II) with monomer (I), which is a compound selected from those of Formulas I to XI above), based on the combined weights of these components. Those compositions containing from about 60 to 95 percent by weight of the chloride component have been found to be useful as fiberforming materials, and are compatible with polyvinyl chloride or polyvinylidene chloride (the monomer of the chloride component corresponding to that of the polyvinyl or polyvinylidene chloride), which have been found to be substantially homogeneous in character. The fiber-forming polymers embodying the invention can contain anywhere from 30 to 100% by weight of the chloride component as vinyl or vinylidene chloride and up to 70% by weight of another monoethylenic material, and still be non-inflammable. Thus fibers formed from these polymers can be woven into textile fabrics which will not sustain combustion in themselves, a characteristic of considerable utility in the textile field and particularly as regards wearing apparel. The compositions containing from 5 to 60% by weight of chloride component can be added directly to polymers containing at least 85% by weight of vinyl chloride or vinylidene chloride units to form compatible mixtures useful for fiber applications, or the compositions can be left in their reaction medium after the polymerization in accordance with this invention has been effected and preferably is substantially (90–100%) complete, and sufficient additional chloride monomer (corresponding to that in the polymer and the reaction medium) can be added to produce a final product containing from 60 to 95% by weight of chloride component and useful in the preparation of fibers of high softening point and ready susceptibility to dyeing by polymerizing such additional monomer in the presence of the product in the polymerization mixture.

As noted above, an interpolymer of such a monomer (I) as represented by Formulas I to XI with another (different) monoethylenically-unsaturated polymerizable compound (II) containing a (XII)      —CH=C< group is employed in my invention. Thus the interpolymer component can contain from 1–99% by weight, in polymerized form, of a monomer (I) which can be any of the compounds of the Formulas I–XI and 99–1% by weight, in polymerized form of a different monoethylenically unsaturated polymerizable compound (II), based on the combined weights of monomer (I) and compound (II).

As noted above, according to my invention, the preformed polymer can include an interpolymer of any of the monomers (I) represented by the Formulas I–XI with a different monoethylenically unsaturated, polymerizable compound, such as represented by those of Formula XII above and including others of Formulas I–XI, and the chloride monomer can also undergo polymerization alone or in the presence of a different compound (II) as represented by Formula XII. Compounds representative of those of Formula XII include those represented by Formulas I to XI above, in addition to such other compounds as styrene, α-methylstyrene, p-acetaminostyrene, α-acetoxystyrene, vinyl chloride (when chloride monomer is vinylidene chloride), vinylidene chloride (when chloride monomer is vinyl chloride), ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, 2-vinyl pyridine, 5-vinyl pyridine, 2-methyl-5-vinyl pyridine, methacrylic acid, fumaronitrile, acrylonitrile, methacrylonitrile, N-vinylphthalimide, ethylene, etc. Especially useful polymerizable compounds coming within the scope of Formula XII comprise those containing a (XIIa.)      $CH_2$=C< group. The amount of other monoethylenically-unsaturated, polymerizable compound used with the chloride monomer varies from 0 to 70%, based on the combined weights of the chloride monomer and the other monomer, i.e. the chloride monomer represents the "remaining" 30 to 100% of the monomeric material polymerized with the preformed monomer. A particularly useful combination is one consisting of from 40 to 99 percent of the chloride monomer and from 60 to 1 percent of the other monomer.

The polymerization must be carried out in the presence of a dispersing medium, such as water, mixtures of water with acetone, ethanol, dioxane, etc. By dispersing medium is meant a medium producing a dispersion, i.e. a true solution or a colloidal dispersion.

The polymerization can be accelerated by heat, by actinic light and by the use of a well known polymerization catalyst. Such catalysts are commonly used in the art of polymerization, and my invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal and ammonium persulfates), etc. Other catalysts such as the ketazines, azines, etc. can be used. The quantity of catalyst used can be varied, depending on the monomer, amount of diluent, etc. Generally, from 0.1 to 5% by weight, based on the weight of monomers being polymerized, is sufficient for the purposes of my invention. Sufficient catalyst can be used to polymerize completely all monomers necessary to production of the final product, or an amount of catalyst sufficient to polymerize only the monomer, or monomers, in the first polymerization, and additional catalyst can be added to complete the polymerization of the monomer, or monomers, in the second polymerization. The catalyst added to complete the second polymerization can be the same as that used in the first polymerization or it can be a different polymerization catalyst. I have found that it is especially advantageous to use an amount of catalyst sufficient to polymerize only the first monomer, or monomers, and then upon addition of the second monomer, or monomers, to add a further amount of catalyst at that time. This procedure provides a readier means for regulating the molecular weight distribution of the polymer composition.

When the preformed polymer is separated from its polymerization medium, and redissolved in a solvent or suspended in an aqueous medium, all of the reactive groups in the polymer chain are apparently closed, or rendered inactive, and polymerization of additional monomer with this separated polymer causes lowering of softening temperature in certain instances. Other properties of the polymers thus produced are also different. When the polymerization is carried out in the presence of a polymer which has not been separated from its polymerization, the polymerization of the added monomer, or monomers, proceeds by addition to unreacted portions of the reactive polymer, as well as undergoing some homopolymerization or interpolymerization. The compositions obtained according to my invention are not to be confused with simple interpolymers, which have a low softening temperature, as has been noted above.

The temperature at which the process of my invention can be carried out is not critical. Generally, a temperature of from 15° to 75° is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amines, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e.g. potassium, sodium, etc. bisulfites) can be added to reduce the time required for the polymerization to be effected.

The polymerization can be carried out batchwise but is more desirably carried out in continuous fashion. The products formed by continuous processes have a number of advantages. They are more homogenous and have certain improved properties such as improved solubility over products obtained from analogous batch processes. The continuous processes contemplated herein fall into two main groups: (1) those which are carried out in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). In the preferred process, the chloride monomer alone or with another monomer or monomers containing a regulator such as tertiary dodecyl mercaptan is placed in a suitable storage or supply tank under an atmosphere or nitrogen. In another supply tank, under nitrogen, is charged air-free deionized water containing other reactants including the initial polymerization mixture containing preformed polymer, the polymerization catalyst, and an acidic reagent such as phosphoric acid for regulating the pH of the reaction mixture. A third tank contains the reducing agent or activator such as potassium metabisulfite in solution in air-free deionized water.

The preferred procedure is to continuously draw the appropriate amounts of solutions or dispersions from the supply vessels into a reactor, subject the mixture to polymerizing conditions and continuously withdraw the graft polymer product from the reactor. By this means, the monomer or monomers are continuously graft polymerized with the preformed polymer at conversions of 60–90% or more of the monomeric material. The length of time between the addition of any increment of reactants to the reactor and the removal of the polymer formed therefrom is defined as the contact time. At equilibrium, the polymer emulsion or slurry is removed from the reactor by suitable means at the same total rate that the ingredients are being added from the supply tanks. Thus, the contact time in the reactor can be conveniently controlled by the absolute rate of addition of the reactants. Usually, the contact time is between 1 and 3 hours, although longer periods are advantageous in some cases. Although the described procedure is preferred, the process can be varied in a number of ways. For example, the ingredients to be added can be combined or separated by using a smaller or larger number of supply tanks, with the practical minimum being two supply tanks, one for the activator and the other for the remaining ingredients. The initial polymer can also be formed continuously and the reaction mixture containing the unseparated polymer added continuously to the second step reactor.

The preferred continuous process gives a highly uniform product having excellent solubility characteristics. Thus, for example, graft polymers can be prepared with 15–25% by weight of preformed polymer, such as an acrylamide copolymer, and 85–75% by weight of monomeric material consisting of 40–60% vinyl or vinylidene chloride and 60–40% acrylonitrile, and such polymers are readily soluble in acetone to give solutions from which textile fibers of high softening temperature, good tensile strength and elongation, good dyeability and non-inflammability can be readily spun by the usual fiber spinning techniques.

Although the continuous process is preferred, a batch or continuous batch process can be employed with good results. In the continuous batch processes, the various ingredients of the polymerization mixture can be added to the reactor in various ways. Thus, the catalyst, activator, preformed but unisolated polymer, water, etc. can be charged to the reactor in a batch and the monomeric material and regulator added continuously; the monomeric material, regulator, catalyst, polymer, water, etc. can be charged to the reactor and the activator added continuously; the monomer, regulator, activator, polymer, water, etc. can be charged to the reactor and the catalyst added continuously; or the monomer, polymer, regulator, water, etc. can be charged to the reactor and the catalyst and activator added continuously, either together or separately.

The following examples will serve to illustrate more fully the manner whereby I practice my invention:

Example 1

2.5 g. of N-methylmethacrylamide and 0.5 g. of acrylamide were dissolved in 75 ml. of water containing 0.05 g. of ammonium persulfate and 0.05 g. of sodium bisulfite. Polymerization was completed by heating at 35° C. for 12 hours. 4.2 g. of vinyl chloride, 2.8 g. acrylonitrile, 0.1 g. ammonium persulfate and 0.1 g. sodium bisulfite were then added and polymerization completed by heating at 35° C. for an additional 12 hours. Precipitated polymer was obtained in 90 percent yield and contained 21 percent amide by analysis. The resultant polymer is soluble in methyl-ethylketone. Fibers obtained from the polymer have excellent affinity for dyes.

Example 2

1 g. of acrylamide and 2 g. of N-methylacrylamide were added to 100 ml. of water containing 0.05 g. of potassium persulfate plus 1 g. of orthophosphoric acid. Polymerization was completed by heating at 50° C. for 12 hours. 4.2 g. of vinyl chloride, 2.8 g. of acrylamide, 6.1 g. of potassium persulfate and 0.1 g. of sodium bisulfite were added to the cooled reaction mixture and the polymerization completed by heating at 35° C. for an additional 8 hours. Precipitated polymer was obtained with a 95 percent yield and was soluble in such solvents as acetone, methylethylketone and cyclohexanone. Fibers obtained from this polymer show excellent affinity for acetate, wool, direct, and vat dyes.

Example 3

1.5 g. of N-methylmethacrylamide and 0.5 g. acrylamide were dissolved in 75 ml. of water containing 0.05 g. ammonium persulfate and 0.05 g. sodium bisulfite. Polymerization was completed by heating at 35° C. for 12 hours. 8 g. of vinylidene chloride, 0.1 g. of ammonium persulfate and 0.1 g. of sodium bisulfite were added and the polymerization completed by heating at 35° C. for an additional 12 hours. The precipitated polymer was obtained in a 90 percent yield and contained approximately 21 percent amide by analysis. The resultant polymer was soluble in such solvents as dimethylformamide and dimethylacetamide. Fibers obtained from the polymer have a softening point above 200° C. and have excellent affinity for dyes.

Example 4

1 g. of acrylamide and 2 g. of N-methylacrylamide were added to 100 ml. of water containing 0.5 g. potassium persulfate and 1 g. ortho phosphoric acid. Polymerization was completed by heating at 50° C. for 12 hours. 5 g. of vinylidene chloride and 2 g. of acrylamide, 0.1 g. potassium persulfate, 0.1 g. sodium bisulfite and 1 ml. of 7-ethyl-2-methyl undecane-4-sulfonic acid sodium salt (Tergitol No. 4) were added to the cooled reaction mixture and the polymerization completed by heating at 35° C. for an additional 8 hours. The precipitated polymer was obtained in 95 percent yield and was soluble in such solvents as dimethylacetamide and dimethylformamide. Fibers obtained from this polymer show excellent affinity for dyes and have a softening point above 185° C.

Example 5

2.5 grams of fumaramide and 0.5 gram of acrylonitrile were emulsified in 75 cc. of distilled water containing 0.05 gram of ammonium persulfate, 0.05 gram of sodium bisulfite and 1 gram of a sulfonated ether (Triton 720). The resulting emulsion was then heated at 35° C. for 12 hours. There was then added 6 grams of vinyl chloride, 1 gram of vinyl acetate, 0.1 gram of ammonium persulfate and 0.1 gram of sodium bisulfite, and the polymerization mixture was heated at 35° C. for an additional 12 hours. The precipitated polymer was obtained in a 93 percent yield and contained 59.5 percent by weight of vinyl chloride based on analysis. Fibers spun by extruding a solution of the polymer product in cyclohexanone into a precipitating bath had a softening point above 145° C., an extensibility of 33 percent and showed excellent affinity for dyes.

Example 6

3.5 grams of vinylidene chloride and 3.5 grams of acrylonitrile were emulsfied in 100 cc. of distilled water, having dissolved therein 0.1 gram potassium persulfate, 0.1 gram sodium bisulfite, 1 gram of ortho phosphoric acid and 2 grams of aryloxy polyalkylene sulfonated ether (Triton 720). The emulsion was then heated at 35° C. for 8 hours. There was then added 1 gram of acrylonitrile and 2 grams of N,N'-dimethyl fumaramide and heating was resumed for an additional 12 hours at 50° C. The precipitated polymer was obtained in a 93 percent yield and contained 35 percent by weight vinylidene chloride on analysis. Fibers spun from the polymer had a softening point above 150° C. and showed excellent dye affinity.

Example 7

1 gram of methyl methacrylate and 2 grams of N,N'-dimethyl maleamide were dissolved in 50 cc. of acetonitrile containing 0.5 gram of benzoyl peroxide and the solution was heated at 50° C. for 24 hours. The solution was cooled to room temperature and 6.4 grams of vinyl chloride, 0.6 gram of methyl acrylate and 0.1 gram of benzoyl peroxide were added. The reaction mixture was then heated at 50° C. for an additional 16 hours. The precipitated polymer was obtained in a 94 percent yield and contained approximately 64 percent vinyl chloride based on analysis. Fibers spun by extruding a solution of the polymer product obtained above in dimethyl acetamide into a precipitating bath had a softening point above 135° C. and showed excellent affinity for dyes. The polymer can be mixed with polyvinyl chloride or copolymers of vinyl chloride containing 50 percent or more vinyl chloride in all proportions and dissolved to give stable solutions which do not separate into distinct layers on standing and from which fibers and films of homogeneous character can be spun, extruded or cast.

Example 8

1.3 grams of N,N-dimethyl ethyl fumaramate and 1 gram of methyl fumaramate were suspended in 20 cc. of distilled water containing 0.02 gram of ammonium persulfate and 0.02 gram of sodium bisulfite and 1 gram of Triton 720 (a sulfonated ether). The resulting emulsion was then heated at 50° C. for 16 hours. After cooling to room temperature, a dispersion of 7 grams of vinyl chloride, 0.7 gram of dimethyl fumarate, 0.1 gram of ammonium persulfate, 0.1 gram of sodium bisulfite and 1 gram of Triton 720 (a sulfonated ether) in 50 cc. of water was added. The dispersion was tumbled end over end at 50° C. for an additional 12 hours. The precipitated polymer weighed 9.4 grams and contained approximately 70 percent by weight of vinyl chloride based on analysis. Fibers spun by extruding a solution of the polymer product in γ-butyrolactone into a precipitating bath had a softening point above 155° C. and showed good dye affinity.

Example 9

2.4 grams of methyl α-acetamino acrylate and 2 grams of N-methyl ethyl maleamate were added to a solution of 0.05 grams of ammonium persulfate, 0.05 gram of sodium bisulfite and 2 grams of Triton 720 (a sulfonated ether) in 75 cc. of distilled water. The reaction mixture was then heated at 35° C. for 8 hours. After cooling to room temperature, 5 grams of vinylidene chloride, 0.6 gram of dimethyl malemate, 0.05 gram of ammonium persulfate and 0.05 gram of sodium bisulfite were added and heating was continued for 8 hours at 35° C. The resulting polymer was obtained in a 95 percent yield and contained 50 percent vinylidene chloride based on analysis. The polymer was soluble in such solvents as dimethyl acetamide, dimethyl formamide and cyclohexanone. Fibers spun from the polymer had a softening point above 175° C. and showed excellent dye affinity.

*Example 10*

1 gram of acrylonitrile and 3 grams of N-methyl methyl itaconamate were emulsified in 50 cc. of distilled water containing 0.04 gram of potassium persulfate and 0.04 gram of ammonium bisulfite and 1 gram of potassium laurate. The resulting emulsion was heated for 16 hours at 25° C. and cooled to room temperature. Then 6 grams of vinyl chloride were added along with 0.06 gram of potassium persulfate. The reaction mixture was allowed to stand for 48 hours at room temperature. The precipitated product was then filtered, washed several times with fresh sources of distilled water and dried. There was thus obtained 9.6 grams of polymer containing approximately 60.2 percent by weight vinyl chloride based on analysis. The polymer was readily soluble in dimethyl formamide. Fibers prepared from this polymer had a softening point above 180° C. and showed good dye affinity.

*Example 11*

4.9 grams of N-isopropyl methacrylamide, 1 gram of N,N-dimethyl methyl itaconamate were dissolved in 50 cc. of acetonitrile containing 0.1 gram of benzoyl peroxide. The resulting solution was heated for 16 hours at 45° C. and cooled to room temperature. There were then added 4.1 grams of vinylidene chloride and 0.1 gram of benzoyl peroxide and the reaction mixture heated for an additional 12 hours at 50° C. The product was filtered off, washed with distilled water and dried. The dried product contained approximately 40 percent by weight of vinylidene chloride and a stable homogeneous solution resulted when the product was dissolved in N,N'-dimethyl acetamide containing polyvinylidene chloride.

*Example 12*

3 grams of N-isopropyl ethyl itaconamate, 4.8 grams of methyl citraconamate were emulsified in 75 cc. of distilled water containing 0.1 gram of ammonium persulfate and 0.1 gram of sodium bisulfite along with 4 grams of Triton 720 (a sulfonated ether). The resulting emulsion was heated at 50° C. for 16 hours and after cooling to room temperature, 2 grams of vinyl chloride and 0.2 gram of vinylidene chloride, 0.1 gram of ammonium persulfate and 0.01 gram of sodium bisulfite were added. The reaction mixture was then tumbled end over end for 12 hours at 50° C. The product was filtered off, washed with water, and dried. It contained approximately 22 percent vinyl chloride, vinylidene chloride based on analysis.

*Example 13*

1 gram of acrylonitrile and 2 grams of N-methyl acrylamide were added to 100 cc. of distilled water having dissolved therein 0.05 gram of potassium persulfate and 1 gram of ortho phosphoric acid. The solution was then heated at 50° C. for 12 hours. There was then added 7 grams of vinyl chloride, 0.1 gram sodium bisulfite and 0.1 gram of potassium persulfate to the cooled reaction mixture and heating was resumed for 8 hours at 35° C. The precipitated polymer was obtained in a 92 percent yield and contained 69.5 percent vinyl chloride based on analysis. Fibers spun by extruding a solution of the polymer product in N,N-dimethyl formamide into a precipitating bath had a softening point above 175° C. and showed excellent dye susceptibility.

*Example 14*

1 gram of methacrylamide and 1 gram of N,N-dimethyl acrylamide were added to 50 cc. of water containing 0.05 gram (calculated as 100 percent) hydrogen peroxide and 0.5 gram of oxalic acid and the solution was heated at 50° C. for 12 hours. The solution was cooled to room temperature and 7.7 grams of vinylidene chloride and 0.3 gram of methacrylamide and 0.1 gram (calculated as 100 percent) of hydrogen peroxide were added. Heating was then continued for an additional 16 hours at 50° C. The precipitated polymer was obtained in a 93 percent yield and contained approximately 77.1 percent vinylidene chloride based on analysis.

*Example 15*

1 gram of methyl methacrylate and 2 grams of N-methyl acrylamide were dissolved in 50 cc. of acetonitrile containing 0.05 gram of benzoyl peroxide and the solution was heated at 50° C. for 24 hours. The solution was cooled to room temperature and 7 grams of vinylidene chloride and 0.1 gram of benzoyl peroxide were added. The reaction mixture was then heated at 50° C. for an additional 12 hours. The precipitated polymer was obtained in a 94 percent yield and contained approximately 69.8 percent vinylidene chloride based on analysis. Fibers spun by extruding a solution of the polymer product obtained above in N,N-dimethyl formamide into a precipitating bath had a softening point above 190° C. and showed excellent affinity for dyes.

*Example 16*

2 grams of vinyl acetate and 0.2 gram of acrylonitrile were emulsified in 80 cc. of water containing 0.01 gram of ammonium persulfate and 0.01 gram of sodium bisulfite and 3 grams of Triton 720 (a sulfonated ether). The resulting emulsion was heated at 35° C. for 6 hours. After cooling to room temperature, 7.8 grams of vinyl chloride, 0.1 gram of ammonium persulfate and 0.1 gram of sodium bisulfite were added. The reaction mixture was then tumbled end over end for 12 hours at 50° C. The product was filtered off, washed with water and dried. It contained 77.9 percent by weight of vinyl chloride based on analysis.

*Example 17*

As was indicated hereinabove, the advantageous properties of the fiber-forming chloride polymers as well as the noninflammable characteristics are retained with the chloride component containing from 30 to 100% by weight of vinyl or vinylidene chloride and 70–0% of another ethenoid monomer. Thus, 2.5 grams of N-methylmethacrylamide and 0.5 gram of acrylamide were dissolved in 75 ml. of water containing 0.05 gram ammonium persulfate and 0.05 gram potassium bisulfite. Polymerization was completed by heating at 35° for 12 hours. 2.25 grams of vinylidene chloride, 5.25 grams of acrylonitrile, 0.1 gram of ammonium persulfate and 0.1 gram of sodium bisulfite were then added, and polymerization was completed by heating at 35° C. for an additional 12 hours. The precipitated polymer was soluble in dimethylformamide. Fibers obtained therefrom melted at 200° C., had an excellent affinity for dyes, and are noninflammable.

*Example 18*

The effect of the chloride component on inflammability is illustrated in this example. 2.5 grams of N-methylmethacrylamide and 0.5 gram of acrylamide were dissolved in 75 ml. of water containing 0.05 gram of ammonium persulfate and 0.05 gram of sodium bisulfite. Polymerization was completed by heating at 35° C. for 12 hours. 1.5 grams of vinylidene chloride, 6.0 grams of acrylonitrile, 0.1 gram of ammonium persulfate and 0.1 gram of sodium bisulfite were then added, and the polymerization was completed by heating at 35° C. for an additional 12 hours. The precipitated polymer was isolated by filtration, and was washed and dried. Fibers spun therefrom had a high softening point, and excellent affinity for dyes but were inflammable.

*Example 19*

1 gram of acrylamide and 2 grams of N-methylacrylamide were added to 100 ml. of water containing 0.05 gram of potassium persulfate plus 1 gram of orthophosphoric acid. Polymerization was completed by heating at 50° C. for 12 hours. 3.0 grams of vinyl chloride, 4.5 grams of methacrylonitrile, 0.1 gram of potassium persulfate, and 0.1 gram of sodium bisulfite were added to the cool reaction mixture and the polymerization was completed by heating at 35° C. for an additional 8 hours. The precipitated polymer was isolated by filtration, and was washed and dried. Fibers obtained from this polymer showed an excellent affinity for acid wool and direct dyes and were noninflammable.

Similarly improved results are obtained with other polymers prepared in accordance with the invention. The polymers obtained can be compounded with the usual compounding materials if desired such as pigments, dyes, fillers, softeners and the like in accordance with usual practices.

Other solvents which can be used for the preparation of fibers from the new polymers of my invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 percent by weight.

Instead of using an aqueous medium as is disclosed in a number of the above examples, it is possible to use organic solvents, such as acetonitrile, aromatic hydrocarbons, such as benzene, toluene, etc., liquid alkanes, such as n-heptane, etc., aliphatic ethers, acetone, etc. As noted above, organic solvents which are water soluble can be used along with water in the polymerization. The term dispersion as used herein is intended to include both true solutions and emulsions.

The polymers of my invention can also be used in the preparation of sheets, films, tapes, etc. In film form, the polymers can be employed as film base in the manufacture of either black-and-white or color photographic film, wherein the base supports a photosensitive emulsion layer or layers, such as silver halide emulsions.

The invention has been described in detail with particular reference to certain preferred embodiments thereof, but it will be understood that variations and modifications can be effected within the spirit and scope of the invention as described hereinabove and as defined in the appended claims.

This application is a continuation-in-part of my co-pending application Serial No. 316,062, filed October 21, 1952, and now abandoned.

I claim:

1. The process which comprises graft copolymerizing at a temperature of 15–75° C. in water and in the presence of a peroxy polymerization catalyst a mixture of (A) 60–95% by weight of monomeric material consisting of 30–99% of chloride monomer from the group consisting of vinyl chloride and vinylidene chloride and 70–1% of monomer from the group consisting of acrylonitrile, acrylamide, vinyl acetate, methyl acrylate, methacrylamide, methacrylonitrile, and (B) 40–5% by weight of an unisolated preformed copolymer of (1) 1–99% by weight of a material (I) of the formula

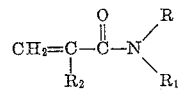

wherein R and $R_1$ are members of the group consisting of hydrogen and alkyl groups of 1–4 carbon atoms, and $R_2$ is a member of the group consisting of hydrogen and methyl, and (2) 99–1% by weight of a different material (II) from the group consisting of amides having the foresaid structural formula, acrylonitrile and methyl methacrylate.

2. The process which comprises graft copolymerizing at a temperature of 15–75° C. in water and in the presence of a peroxy polymerization catalyst a mixture of (A) 60–95% by weight of monomeric material consisting of 30–99% vinylidene chloride and 70–1% acrylonitrile and (B) 40–5% by weight of a copolymer of (1) 1–99% by weight of N-methyl methacrylamide and (2) 99–1% by weight of acrylamide.

References Cited in the file of this patent

UNITED STATES PATENTS

| | | |
|---|---|---|
| 2,614,089 | Harrison | Oct. 14, 1952 |
| 2,657,191 | Coover et al. | Oct. 27, 1953 |
| 2,666,025 | Nozaki | Jan. 12, 1954 |
| 2,666,042 | Nozaki | Jan. 12, 1954 |

FOREIGN PATENTS

| | | |
|---|---|---|
| 627,265 | Great Britain | Aug. 4, 1949 |

OTHER REFERENCES

Smets et al.: Journal Polymer Science, volume 8, pages 289–311, March 1952.

Wakeman: The Chemistry of Commercial Plastics, page 403, Reinhold Pub. Corp., New York (1947).